(12) United States Patent
Yamanaka

(10) Patent No.: US 12,542,975 B2
(45) Date of Patent: Feb. 3, 2026

(54) IMAGE PROCESSING APPARATUS TO GENERATE COMPOSITE IMAGE, CONTROL METHOD, AND RECORDING MEDIUM

(71) Applicant: CANON KABUSHIKI KAISHA, Tokyo (JP)

(72) Inventor: Yohei Yamanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 270 days.

(21) Appl. No.: 18/177,587

(22) Filed: Mar. 2, 2023

(65) Prior Publication Data
US 2023/0283911 A1  Sep. 7, 2023

(30) Foreign Application Priority Data
Mar. 7, 2022  (JP) .................................. 2022-034770

(51) Int. Cl.
 *H04N 23/741* (2023.01)
 *G06T 5/50* (2006.01)
 *G06V 10/60* (2022.01)
 *H04N 5/202* (2023.01)

(52) U.S. Cl.
 CPC ............. *H04N 23/741* (2023.01); *G06T 5/50* (2013.01); *G06V 10/60* (2022.01); *H04N 5/202* (2013.01); *G06T 2207/20208* (2013.01); *G06T 2207/20221* (2013.01); *G06T 2207/30168* (2013.01)

(58) Field of Classification Search
 CPC ...... H04N 23/741; H04N 5/202; G06V 10/60; G06V 10/16; G06T 5/50; G06T 2207/20221; G06T 2207/20208
 See application file for complete search history.

(56) References Cited

U.S. PATENT DOCUMENTS

| | | | | |
|---|---|---|---|---|
| 9,613,409 B1* | 4/2017 | Tsai | ..................... | G09G 3/3406 |
| 9,736,390 B2* | 8/2017 | Suzuki | ..................... | G06T 5/92 |
| 10,902,567 B2* | 1/2021 | Mertens | ................. | H04N 5/265 |
| 11,496,798 B2* | 11/2022 | Walls | ......................... | G06T 5/40 |
| 2016/0189409 A1* | 6/2016 | Aiba | ........................ | G09G 5/10 |
| | | | | 345/629 |
| 2018/0220054 A1* | 8/2018 | Swami | .................... | H04N 25/58 |
| 2020/0074710 A1* | 3/2020 | Kunkel | ..................... | G06T 7/90 |
| 2020/0084362 A1* | 3/2020 | Huang | ........................ | G06T 5/50 |
| 2020/0327649 A1* | 10/2020 | Kimura | .................. | H04N 23/80 |
| 2021/0185390 A1* | 6/2021 | Nishi | .................... | H04N 21/435 |

FOREIGN PATENT DOCUMENTS

| | | |
|---|---|---|
| JP | 2019103041 A | 6/2019 |
| JP | 2020039118 A | 3/2020 |
| JP | 2021144295 A | 9/2021 |
| WO | 2016038950 A1 | 3/2016 |

\* cited by examiner

*Primary Examiner* — Utpal D Shah
*Assistant Examiner* — Jack Peter Kraynak
(74) *Attorney, Agent, or Firm* — Canon U.S.A., Inc., IP Division

(57) ABSTRACT

An image processing apparatus acquires a first image and a second image having a dynamic range wider than a dynamic range of the first image, generates a converted image by converting the dynamic range of the first image, and generates a composite image by compositing the second image and the converted image. The apparatus decides a composition range based on the second image, and converts the dynamic range of the first image into the composition range.

12 Claims, 7 Drawing Sheets

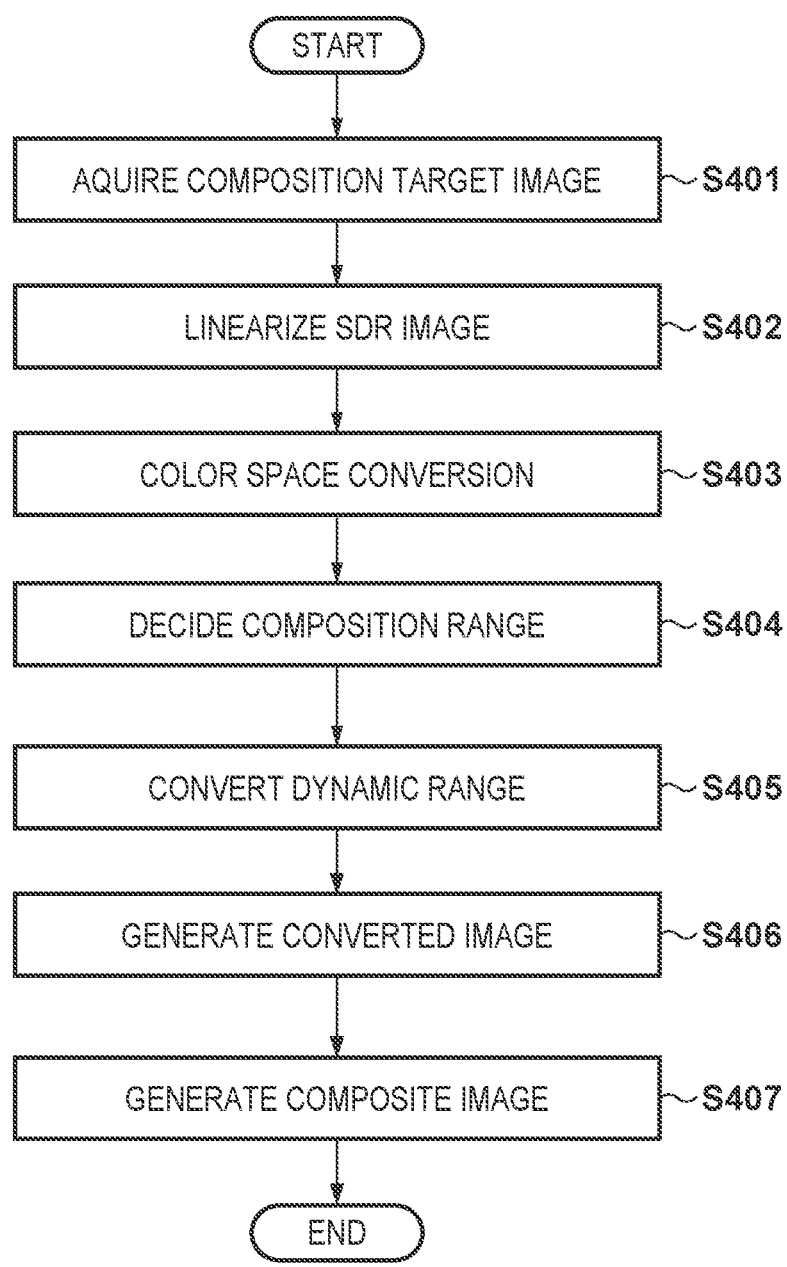

FIG. 7A
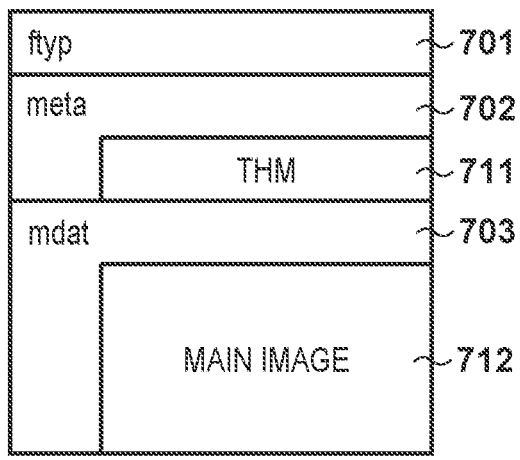
FIG. 7B
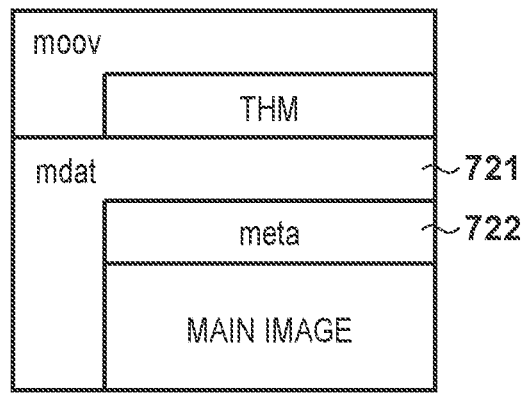
FIG. 8
| IMAGE CAPTURING MODE | MAXIMUM SIGNAL PQ CODE VALUE (10bit) | MAXIMUM LUMINANCE [nit] |
|---|---|---|
| HIGH LUMINANCE SIDE • GRADATION PRIORITIZATION: YES | 290 | 632 |
| HIGH LUMINANCE SIDE • GRADATION PRIORITIZATION: NO | 650 | 721 |

IMAGE PROCESSING APPARATUS TO GENERATE COMPOSITE IMAGE, CONTROL METHOD, AND RECORDING MEDIUM

BACKGROUND

Technical Field

One disclosed aspect of the embodiments relates to an image processing apparatus, a control method, and a recording medium and, more particularly, to a technique of compositing images with different dynamic ranges.

Description of the Related Art

There is provided a technique of generating, by compositing a plurality of captured images, a composite image of a multiple exposure expression in which images appearing in the respective captured images are superimposed on each other. Examples of a composition method related to the multiple exposure expression are additive composition of adding pixel values at identical positions in a plurality of images to be composited, lighten composition of setting a pixel value of higher luminance as a pixel value after composition, and darken composition of setting a pixel value of lower luminance as a pixel value after composition.

A general sRGB 8-bit image such as a Joint Photographic Experts Group (JPEG) image is a Standard Dynamic Range (SDR) image, in which the luminance (scene luminance) of a captured scene is represented by a pixel value falling within the range of 0 to 255. If a composite image of a multiple exposure expression is obtained by compositing SDR images, the output composite image is also an SDR image represented by pixel values each falling within the range of 0 to 255.

In recent years, a display device called a High Dynamic Range (HDR) display in which the performance of a light emitting element such as a light emitting diode (LED) is improved and the display luminance dynamic range is wider than that of a conventional display device has appeared on the market, and the display device can display an image of a gradation expression corresponding to the dynamic range wider than that of the SDR image. Therefore, some image capturing apparatuses can record an HDR image so that an expression of a detail and color in each luminance range can be confirmed on the display device. Such HDR image has, as a pixel value, 10-bit display luminance, that is, display luminance from 0 to 1,023 generally obtained by converting the scene luminance.

Since the resolution of the pixel value is different between the HDR image and the SDR image, when generating a composite image of a multiple exposure expression, it is impossible to simply composite the images. Japanese Patent Laid-Open No. 2019-103041 discloses a technique of generating and outputting an HDR composite image by mapping the luminance range of an SDR image to the luminance range of an HDR image so that a display device capable of displaying an SDR image and an HDR image can display a composite image of these images in a preferable state. More specifically, in Japanese Patent Laid-Open No. 2019-103041, an image processing apparatus adopts a method of acquiring information indicating the luminance range such as maximum luminance unique to the display device, converting the SDR image into the gradation of the HDR luminance range, and compositing the SDR image with the HDR image.

A signal characteristic representing the relationship between the display luminance and a video signal level in the HDR image is defined by an Electro-Optical Transfer Function (EOTF), and the following two kinds of methods are adopted. One method is a Hybrid Log Gamma (HLG) method standardized in ARM STD-B67, in which a video signal level is converted into the relative value of the display luminance and the display luminance corresponding to the maximum luminance that can be output from the display device is obtained. The other method is a Perceptual Quantization (PQ) method standardized in SMPTE ST 2084 or ITU-R BT.2100, in which the video signal level is converted into the absolute value of the display luminance within a maximum range of 10,000 nit (or $cd/m^2$). Therefore, when displaying an HDR image obtained by capturing a scene, scene luminance is converted into display luminance corresponding to the maximum luminance that can be output from the display device in the former method, and scene luminance is converted into display luminance that is absolutely determined regardless of the display device in the latter method. Thus, if display on the display device adopting the PQ method is assumed, for example, it is necessary to convert an image signal of scene luminance to indicate an absolute luminance value in encoding in the image capturing apparatus, thereby generating an HDR image.

Therefore, in encoding in the PQ method of absolutely representing scene luminance, even if the same scene is captured, peak luminance (the maximum value of the display luminance and the maximum value of the output dynamic range) included in the HDR image may change due to a difference in exposure amount. This is because the scene luminance with which the sensor output is saturated changes in accordance with the exposure amount and thus a gamma curve used for conversion varies to assign the absolute display luminance to the same scene luminance. For example, as shown in FIG. 1, the input/output characteristics (the relationships between the number of input stages and output luminance) in two kinds of image capturing modes of different exposure amounts are different in terms of peak luminance (the maximum value of the output luminance). In FIG. 1, an input/output characteristic 11 in the image capturing mode of a high exposure amount is indicated by a solid line and an input/output characteristic 12 in the image capturing mode of a low exposure amount is indicated by an alternate long and short dashed line. As shown in FIG. 1, in the two image capturing modes, a common input/output characteristic is indicated in a region other than a high-luminance region, and scene luminance is converted into the same display luminance regardless of the exposure amount while the peak luminance varies between values 13 and 14 in the high-luminance region in accordance with a difference in luminance with which the output is saturated. Note that a value 15 indicates the maximum value (1023) of 10-bit luminance, and corresponds to the maximum display luminance of 10,000 nit in the PQ method.

That is, in the HDR image in the PQ method, since the peak luminance may change depending on the image capturing mode adopted to capture the image, the saturation level does not always match with the maximum display luminance in the PQ method or the maximum luminance of the display device. Therefore, even if the SDR image and the HDR image are composited by the method described in Japanese Patent Laid-Open No. 2019-103041, a composite image in a preferable form may not be generated, for example, an expression on the high luminance side of the SDR image may appear unnaturally bright.

As exemplified above, if composition processing is performed using an image in which the peak luminance may change depending on the adopted image capturing mode, a preferable composite image may not be generated.

SUMMARY

One aspect of the embodiments has been made in consideration of the above problem and provides an image processing apparatus for generating a composite image by preferably compositing images with different dynamic ranges, a control method, and a recording medium.

The disclosure in its first aspect provides an image processing apparatus includes at least one processor and a memory containing instructions that, when executed by the at least one processor, perform operations configured to function as a first acquisition unit, a conversion unit, and a generation unit. The first acquisition unit is configured to acquire a first image and a second image having a dynamic range wider than a dynamic range of the first image. The conversion unit is configured to generate a converted image by converting the dynamic range of the first image. The generation unit is configured to generate a composite image by compositing the second image and the converted image generated by the conversion unit. The conversion unit decides a composition range based on the second image, and converts the dynamic range of the first image into the composition range.

The disclosure in its second aspect provides a control method for an image processing apparatus, includes acquiring a first image and a second image having a dynamic range wider than a dynamic range of the first image, generating a converted image by converting the dynamic range of the first image, and generating a composite image by compositing the second image and the generated converted image. In the generating the converted image, a composition range is decided based on the second image, and the dynamic range of the first image is converted into the composition range.

The disclosure in its third aspect provides a non-transitory computer-readable recording medium recording a program for causing a computer to function as each unit of the image processing apparatus of the first aspect.

Further features of the disclosure will become apparent from the following description of exemplary embodiments (with reference to the attached drawings).

BRIEF DESCRIPTION OF THE DRAWINGS

FIG. 4 is a flowchart exemplifying the composition processing according to an embodiment.

FIGS. 7A and 7B are views respectively exemplifying the output file formats of a composite image according to an embodiment.

FIG. 8 is a table exemplifying MaxDRL determined in accordance with the image capturing mode.

DESCRIPTION OF THE EMBODIMENTS

Embodiment

Figure 1:
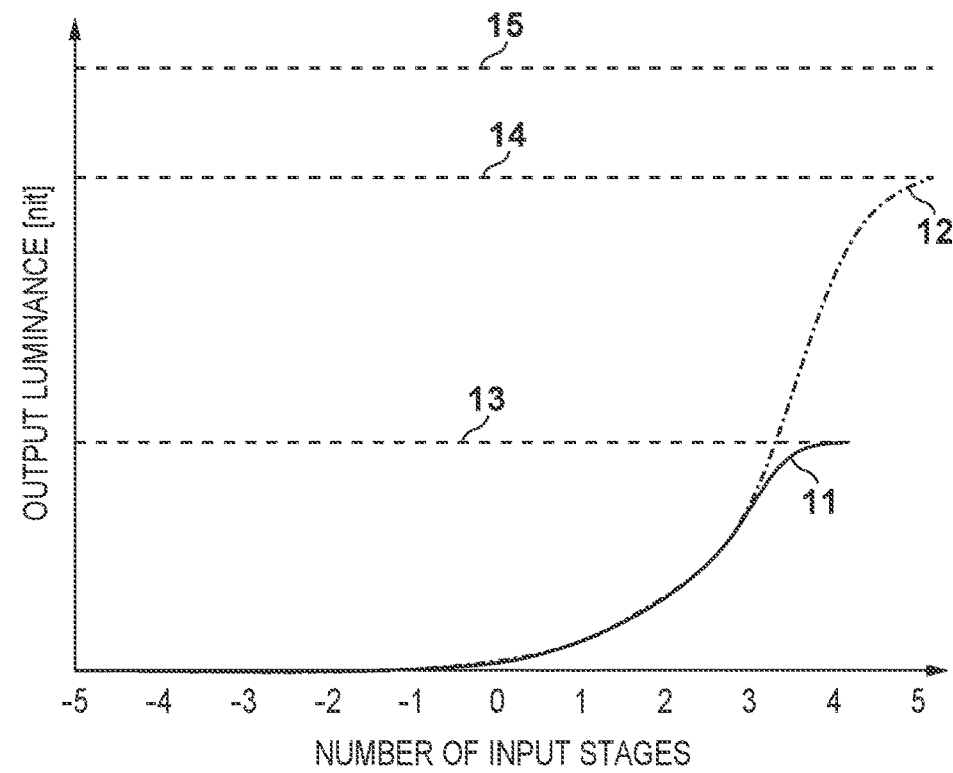
FIG. 1 is a graph for explaining input/output characteristics in two kinds of image capturing modes of different exposure amounts.

Hereinafter, embodiments will be described in detail with reference to the attached drawings. Note, the following embodiments are not intended to limit the scope of the claimed disclosure. Multiple features are described in the embodiments, but limitation is not made to an disclosure that requires all such features, and multiple such features may be combined as appropriate. Furthermore, in the attached drawings, the same reference numerals are given to the same or similar configurations, and redundant description thereof is omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

In an embodiment to be described below, an example in which the disclosure is applied to an image processing apparatus, as an example of an image processing apparatus, that can generate a composite image of a multiple exposure expression by compositing one SDR image and one HDR image encoded by the PQ method is described. However, the disclosure is applicable to an arbitrary apparatus that can generate a composite image by compositing images with different dynamic ranges.

In this specification, an "HDR image" is an image (PQ signal) encoded by the Perceptual Quantization (PQ) method standardized in ITU-R BT.2100 and formed to be able to acquire absolute display luminance by decoding, unless otherwise specified. To the contrary, an "SDR image" is an image encoded by the ITU-R BT.709 standard. In this embodiment, an HDR image and an SDR image used to generate a composite image are actually captured images obtained by capturing an image capturing scene. The following description assumes that the composite image is a PQ signal, similar to the HDR image.

Assume here that an at least 10-bit depth is required to represent an HDR characteristic by a PQ signal, and each of the HDR image and the composite image is not a file storing a 8-bit image in, for example, a JPEG format. For example, each of the HDR image and the composite image may be a High Efficiency Image File Format (HEIF) file stored using the HEIF container as an image file format defined in MPEG-H Part 12 (ISO/IEC 23008-12) developed by the Moving Picture Experts Group (MPEG). The HEIF can store, in one file, not only a main image but also a thumbnail, a plurality of temporally related images, and metadata such as Exchangeable Image Format (EXIF) or Extensible Metadata Platform (XMP). The HEIF is suitable for storing the HDR image or composite image according to the disclosure since an 10-bit image sequence encoded by High Efficiency Video Coding (HEVC) can be stored.

<<Hardware Arrangement of Image Processing Apparatus>>

Figure 2:
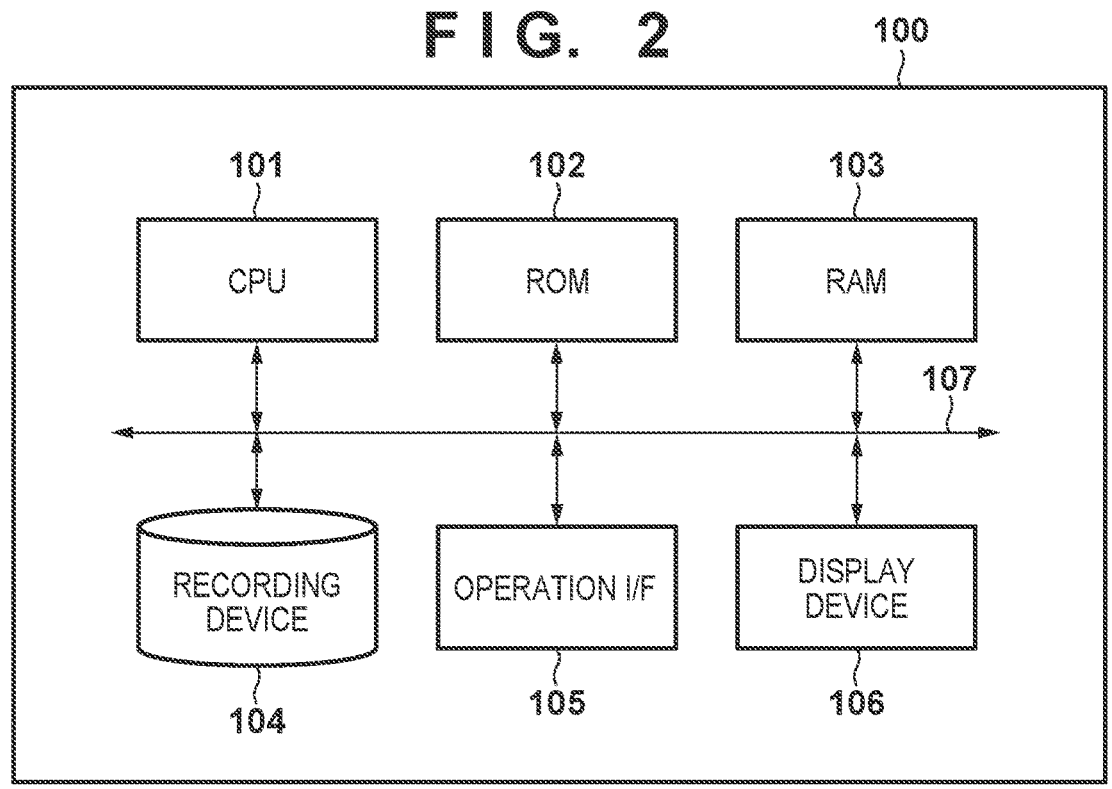
FIG. 2 is a block diagram exemplifying the hardware arrangement of an image processing apparatus 100 according to an embodiment.

FIG. 2 is a block diagram showing the hardware arrangement of an image processing apparatus 100 according to this embodiment. As shown in FIG. 2, the image processing apparatus 100 according to this embodiment includes a CPU 101, a Read Only Memory (ROM) 102, a Random Access Memory (RAM) 103, a recording device 104, an operation I/F 105, a display device 106, and a system bus 107.

The CPU 101 controls the overall image processing apparatus 100. The ROM 102 is a storage device that stores a control program such as a Basic Input/Output System (BIOS) necessary to activate the image processing apparatus 100, and programs, parameters, and data which need not be changed. The RAM 103 is a storage device having a work area of the CPU 101, a primary storage area for temporarily storing various data, a load area of various programs, and the like. The ROM or the RAM contains instructions that, when executed by the CPU 101, perform operations that are configured as units described in the following.

The recording device 104 is a recording device that stores an Operating System (OS) program, various control programs, various software programs executable on the OS program, and various data such as an HDR image to be used for composition processing (to be described later) and a composite image obtained as a result of composition processing. The recording device 104 includes, for example, a hard disk or a flash memory incorporated in or detachably connected to the image processing apparatus 100, and a flexible disk, an optical disk, a magnetooptical disk, an Integrated Circuit (IC) card, or a memory card detachably connected to the image processing apparatus 100. Therefore, the CPU 101 can control the image processing apparatus 100 by deploying various programs stored in the ROM 102 or the recording device 104 into the RAM 103 and executing them.

The operation Interface (I/F) 105 is a user interface provided in the image processing apparatus 100, such as a keyboard, a mouse, or a touch panel. If an operation input by a user is detected, the operation I/F 105 sends a control signal associated with the operation to the CPU 101. The display device 106 is, for example, a liquid crystal display, and displays various kinds of information including a graphical user interface associated with software or the OS operating on the image processing apparatus 100. The system bus 107 communicably connects the respective blocks forming the image processing apparatus 100.

The image processing apparatus 100 may be a dedicated apparatus that develops and edits a captured raw (RAW) image. In this case, a composition processing program can be stored in the ROM 102. Furthermore, a general-purpose personal computer (PC) can function as the image processing apparatus 100 when the CPU 101 deploys the composition processing program stored in the recording device 104 into the RAM 103. An image capturing apparatus that can acquire a RAW image by image capturing can also function as the image processing apparatus 100 when the control unit of the image capturing apparatus executes the composition processing program or an image processing unit for performing composition processing executes a predetermined operation.

<<Composition Processing>>

Figure 3A:
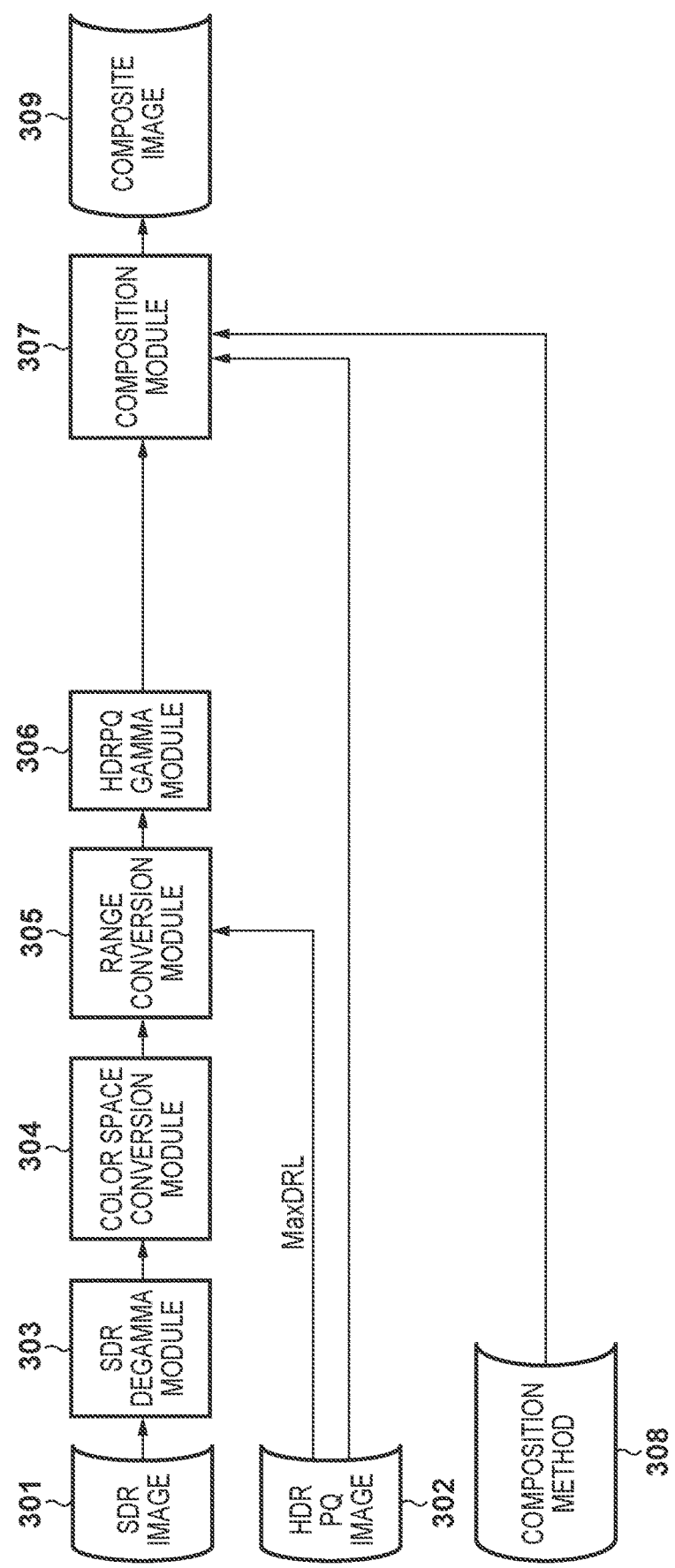
FIGS. 3A and 3B are block diagrams respectively exemplifying the module arrangements of composition processing according to an embodiment.

Composition processing of generating a composite image of a multiple exposure expression by compositing one HDR image and one SDR image, which is executed by the image processing apparatus 100 according to this embodiment, is described in detail with reference to the accompanying drawings. This composition processing is implemented when the CPU 101 reads out the composition processing program from the ROM 102 or the recording device 104, deploys it into the RAM 103, and executes it. FIG. 3A is a block diagram exemplifying the module arrangement of various functions implemented by the CPU 101 while the composition processing of this embodiment is executed. FIG. 4 is a flowchart for explaining the procedure of the composition processing.

As described above, an SDR image and an HDR image used as inputs to the composition processing are images captured using the image capturing apparatus, and the HDR image has a wider dynamic range so as to implement the gradation expression of scene luminance in more detail. Each image is developed by encoding the brightness of an object into a nonlinear signal using an Opto-Electronic Transfer Function (OETF) in the image capturing apparatus that has captured the image. A description is provided by assuming that the HDR image is a PQ image (to be sometime referred to as an HDRPQ image hereinafter) encoded by the PQ method. Therefore, in this embodiment, inputs to the composition processing are an SDR image 301 and an HDRPQ image 302, as shown in FIG. 3A. The OETF is determined for development in the image capturing apparatus and may be provided individually for SDR and HDR.

In step S401, the CPU 101 reads out the SDR image 301 and the HDRPQ image 302 from the recording device 104, and deploys them into the RAM 103. The processing in this step inputs the images to be composited.

Since the SDR image 301 and the HDRPQ image 302 are images representing scene luminance in different dynamic ranges, as described above, the dynamic ranges are preferably made to match with each other to composite the images. In other words, since the SDR image 301 and the HDRPQ image 302 have different ranges of signal level values and cannot easily used for composition, the dynamic ranges of the images need to be made to match with each other. More specifically, the SDR image 301 and the HDRPQ image 302 are images different in terms of the form of converting the brightness of an object into a nonlinear signal using the OETF for SDR or for HDR to generate the image.

In the composition processing of this embodiment, the SDR image 301 is converted into an image (converted image) expressed in the wider dynamic range of the HDRPQ image 302, and the converted image and the HDRPQ image 302 are used to perform composition. Therefore, in subsequent processes in steps S402 to S406, the SDR image 301 is converted into an image (an image (HDRPQ image) in the PQ format) with the dynamic range common to the HDRPQ image 302.

Figure 5A:
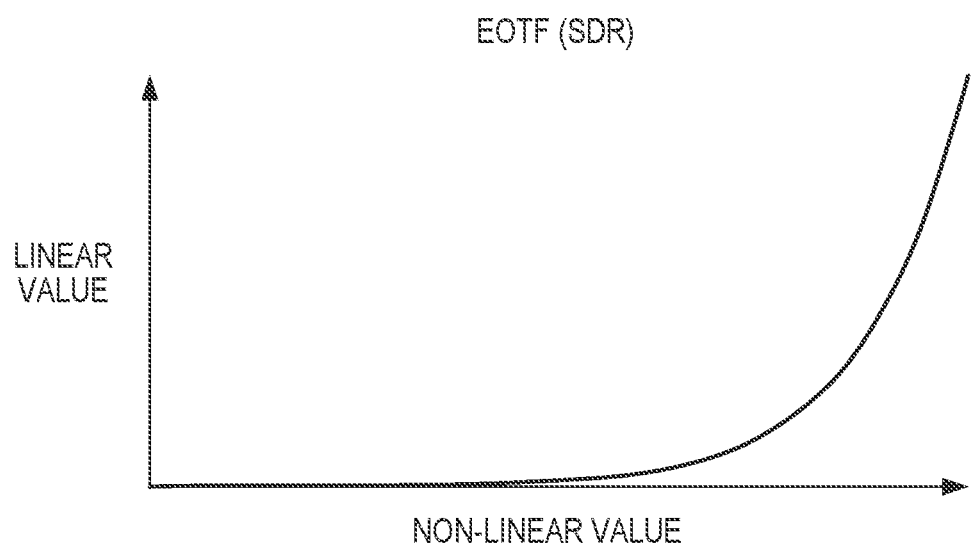
FIGS. 5A and 5B are graphs exemplifying various transfer functions adopted in the composition processing according to an embodiment.

In step S402, an SDR degamma module 303 linearizes the SDR image 301 to be composited. As described above, the SDR image 301 is a nonlinear signal obtained by applying the OETF for SDR. Thus, the SDR degamma module 303 converts the signal level of each pixel of the SDR image 301 into a linear luminance value on a display light by applying, for example, the EOTF for SDR shown in FIG. 5A. That is, the SDR degamma module 303 converts the SDR image 301 to generate a first intermediate image in which each pixel indicates display luminance.

As the EOTF for SDR, the reference EOTF defined in ITU-R BT.709 may be used. Alternatively, the inverse function of the OETF for SDR used in the image capturing apparatus that has captured the SDR image 301 may be used. Note that the OETF is the product of the inverse function of the reference EOTF and an Opto-Optical Transfer Function (OOTF) preset with respect to each exposure setting or based on the generation intention of an output image by a user setting. For example, the EOTF for SDR used for linearization may be recorded in the recording device 104 of the image processing apparatus 100 or acquired from the image capturing apparatus in association with the SDR image 301.

In step S403, a color space conversion module 304 converts the color space of the first intermediate image by the SDR degamma module 303, as needed. In this embodiment, since the HDRPQ image 302 is the HDR image in the PQ format, the color space conversion module 304 performs color space conversion from BT.709 into BT.2020. Details of color space conversion are described in ITU-R BT.2087.

In step S404, the CPU 101 decides the maximum value of the dynamic range for converting the SDR image 301. In the composition processing of this embodiment, the SDR image 301 is converted into an image with the dynamic range common to the HDRPQ image 302, and thus the maximum value of the dynamic range (to be referred to as the composition range hereinafter) after conversion is decided in this step. As described with reference to FIG. 1, since the peak luminance value of the HDR image in the PQ format may change due to a difference in exposure amount, the CPU 101 acquires the peak luminance value of the HDRPQ image 302 and decides it as the maximum value of the composition range in this step. That is, the CPU 101 adopts the maximum signal level of the HDRPQ image 302 as a signal level corresponding to the maximum value of the composition range so the composite image does not become unnatural by compositing an image of a signal level exceeding the maximum signal level of the HDRPQ image 302.

The peak luminance of the HDRPQ image 302 may be included in an image file (HEIF file or the like) associated with the HDRPQ image 302 or may be associated with the HDRPQ image 302 as another file. In this embodiment, the image file associated with the HDRPQ image 302 is added, as metadata, with the Maximum Dynamic Range Level (MaxDRL) described in Japanese Patent Laid-Open No. 2020-039118, and the CPU 101 acquires it as the peak luminance value. MaxDRL indicates the maximum value of the PQ signal output value after the corresponding OETF is applied in development and encoding of the captured image signal, and indicates the peak luminance value (upper limit value) of the dynamic range that can be represented in the HDRPQ image 302. Therefore, this embodiment assumes that MaxDRL indicates the peak luminance value but MaxDRL may be a value indicating the nit value corresponding to the peak luminance value.

Figure 6A:
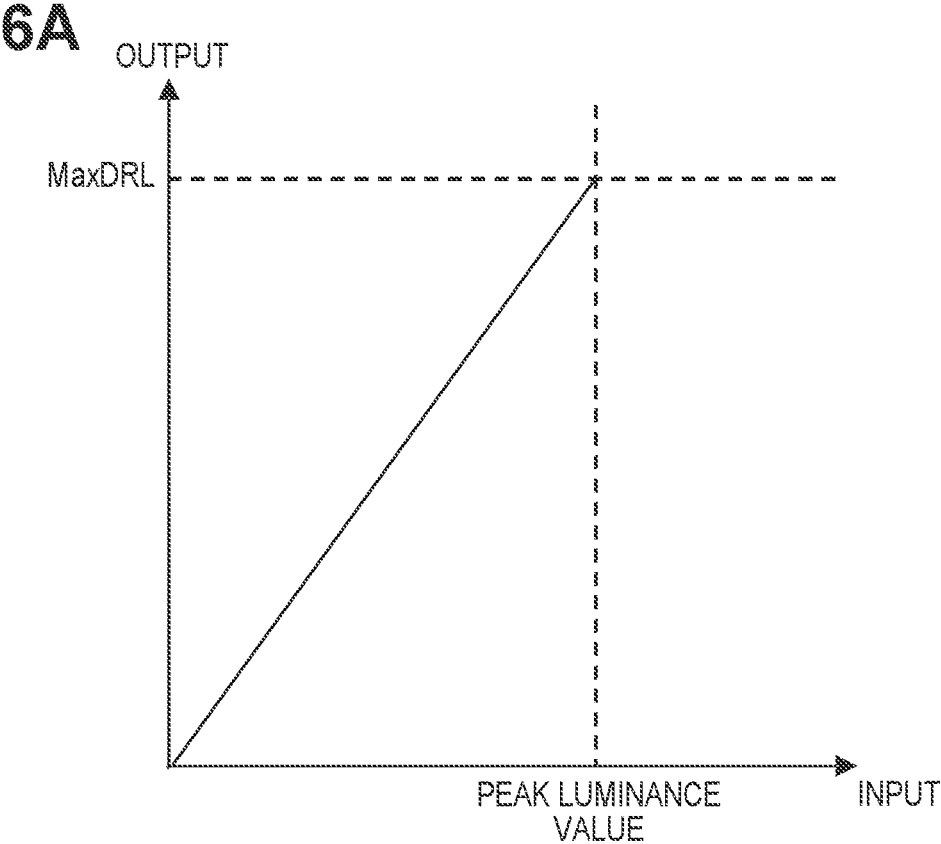
FIGS. 6A and 6B are graphs respectively exemplifying input/output characteristics in a range conversion module 305 according to an embodiment.

In step S405, a range conversion module 305 generates a second intermediate image by converting the dynamic range of the first intermediate image into the composition range with the maximum value decided in step S404. In this embodiment, to generate the second intermediate image, the range conversion module 305 converts the dynamic range into the composition range by converting the luminance value of an input/output characteristic shown in FIG. 6A. In the example shown in FIG. 6A, the abscissa represents the luminance value of the input (first intermediate image) and the ordinate represents the luminance value of the output (second intermediate image), thereby showing the input/output relationship. As shown in FIG. 6A, the input/output characteristic in the range conversion module 305 is obtained by linearly scaling the value range of the luminance value of the first intermediate image to a range whose maximum value is MaxDRL (peak luminance value) of the HDRPQ image 302. Within the value range of the luminance value of the first intermediate image, based on information of a pixel representing white in the SDR image 301, the luminance value of a pixel at the same position in the first intermediate image is defined as the maximum value, that is, the peak luminance value. That is, the range conversion module 305 derives the luminance value of each pixel of the second intermediate image by performing linear conversion so that the peak luminance value of the luminance value of the first intermediate image is MaxDRL of the HDRPQ image 302, thereby generating the second intermediate image with the converted dynamic range. More specifically, the range conversion module 305 derives a conversion factor related to conversion of the dynamic range based on the peak luminance value of the first intermediate image and MaxDRL of the HDRPQ image 302. Then, the range conversion module 305 generates the second intermediate image by storing, as each pixel of the second intermediate image, a luminance value obtained by multiplying the luminance value of each pixel of the first intermediate image by the conversion factor.

Figure 5B:
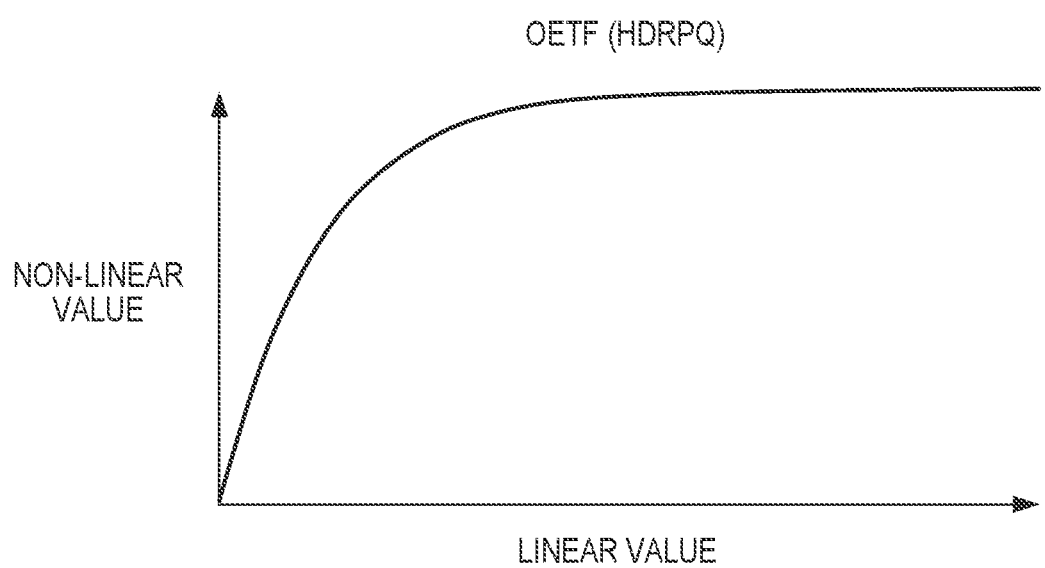

In step S406, an HDRPQ gamma module 306 converts (encodes) the luminance value into a nonlinear signal by applying the gamma to the second intermediate image, thereby generating a converted image. In this embodiment, since the HDRPQ image 302 composited with the converted image is the image in the PQ format, the gamma applied by the HDRPQ gamma module 306 is the OETF for HDR corresponding to the PQ format, as shown in FIG. 5B. As the OETF for HDR, for example, the OETF used for encoding the HDRPQ image 302 included in the metadata of the image file associated with the HDRPQ image 302 can be acquired and used. Alternatively, the OETF for HDR may be derived by, for example, multiplying the OOTF set with respect to the exposure setting associated with image capturing of the HDRPQ image 302 by the inverse function of the reference EOTF defined in ITU-R BT.2100

In step S407, a composition module 307 generates a composite image 309 of a multiple exposure expression by compositing the HDRPQ image 302 and the converted image generated in step S406, thereby completing the composition processing. As the multiple exposure composition method, there are provided a plurality of methods such as additive composition, lighten composition, and darken composition. In the composition processing of this embodiment, therefore, a composition method 308 of uniquely specifying a composition method is accepted as another input in addition to the SDR image 301 and the HDRPQ image 302. The input composition method 308 may be designated based on a user operation input performed via the operation I/F 105 or designated by reading out preset information. Therefore, the composition module 307 executes processing based on the input composition method 308, thereby generating the composite image 309.

Note that the generated composite image 309 may be stored, in the recording device 104, as an image file in the HEIF format as a new PQ image. The image file in the HEIF format has a file structure shown in FIG. 7A. That is, the file in the HEIF format is formed by an ftyp box 701 indicating the file format, a meta box 702 storing metadata including a thumbnail image 711, and an mdat box 703 storing encoded data (main image 712). Therefore, the composition module 307 stores data of the generated composite image 309 in the mdat box 703, and stores the thumbnail image of the composite image 309 and MaxDRL associated with the composite image 309 in the meta box 702, thereby generating a file.

As MaxDRL associated with the composite image 309 included in the metadata, for example, MaxDRL of the HDRPQ image 302 as the input image may be used. Alternatively, as MaxDRL associated with the composite image 309, the maximum signal PQ code value corresponding to the image capturing mode set at the time of capturing the HDRPQ image 302, as shown in a table in FIG. 8, may be read out from the recording device 104 and included as MaxDRL in the metadata. In addition, the metadata may include the OETF used for linearization of the composite image 309 and other information.

The file format of the composite image 309 output by performing the composition processing need only be able to store at least MaxDRL associated with the composite image 309, and, for example, the MP4 format shown in FIG. 7B may be adopted. In this case, MaxDRL is stored in metadata 722 in an mdat box 721.

This embodiment assumes that the composite image as the output of the composition processing is the HDR image in the PQ format. However, the disclosure is not limited to this and an image further converted into an SDR image may be output.

As described above, the image processing apparatus of this embodiment can generate a composite image by preferably compositing images with different dynamic ranges. More specifically, when compositing an SDR image and an DHRPQ image, the SDR image is converted into an image having a dynamic range based on the peak luminance of the HDRPQ image. Therefore, even the SDR image in which absolute luminance is not defined can be composited in a form suitable for the HDRPQ image.

[First Modification]

The above embodiment has described the form in which as the input/output characteristic in the range conversion module 305, the peak luminance value of the first intermediate image is simply, linearly assigned to the value range up to MaxDRL of the HDRPQ image 302, as shown in FIG. 6A. However, the disclosure is not limited to this. For example, as shown in FIG. 6B, the input/output characteristic may be a characteristic which is different between the value ranges of the luminance value before and after a predetermined knee point that is provided as a reference with respect to the luminance value of the first intermediate image.

Figure 6B:
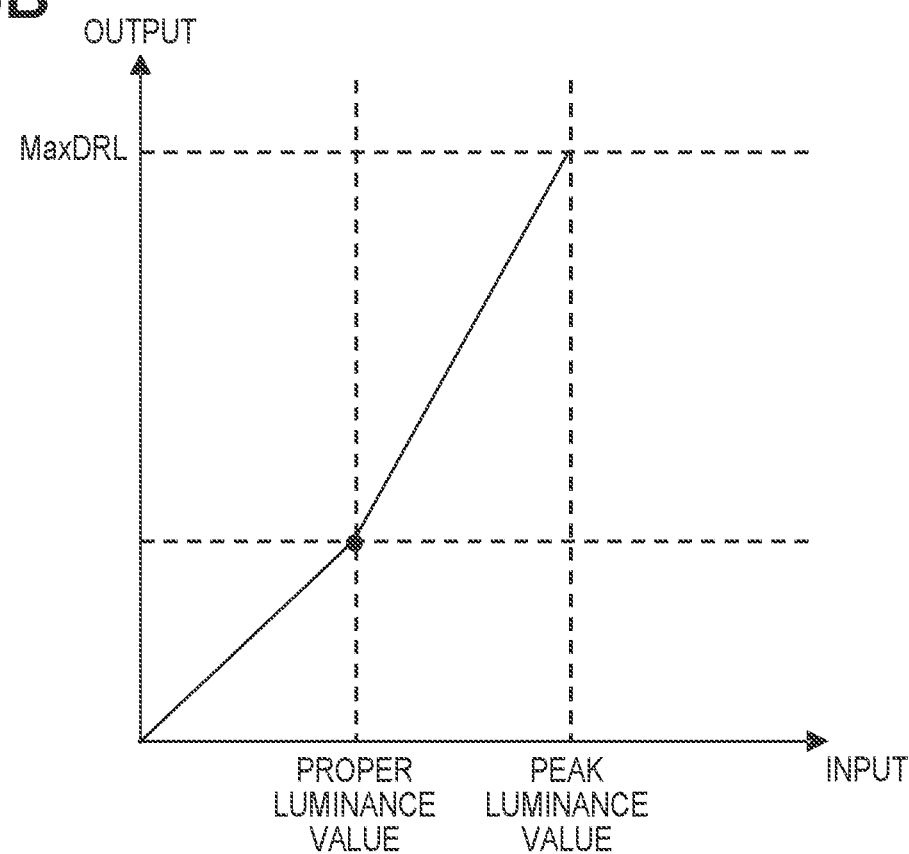

In the example shown in FIG. 6B, the knee point is set at a luminance value associated with a properly exposed object included in the SDR image 301. More specifically, the input/output characteristic shown in FIG. 6B indicates a characteristic indicated by a straight line with an inclination of 1 with respect to the input of the luminance value associated with the value range (first value range) from 0 as the lower limit value of the luminance value to the luminance value (proper luminance value) corresponding to the proper exposure. That is, if the luminance value within the first value range is input, the same value is output. In the input/output characteristic, with respect to the input of the luminance value associated with a value range (second value range) from the proper luminance value to the peak luminance value of the first intermediate image, a value linearly assigned to the value range from the proper luminance value to MaxDRL of the HDRPQ image 302 is output. That is, the inclination related to the input/output characteristic associated with the second value range is adaptively changed in accordance with the proper luminance value associated with the SDR image 301. When the range conversion module 305 adopts such input/output characteristic, the second intermediate image can be generated in the form in which the gradation expression up to the proper exposure in the first intermediate image is maintained.

Figure 3B:
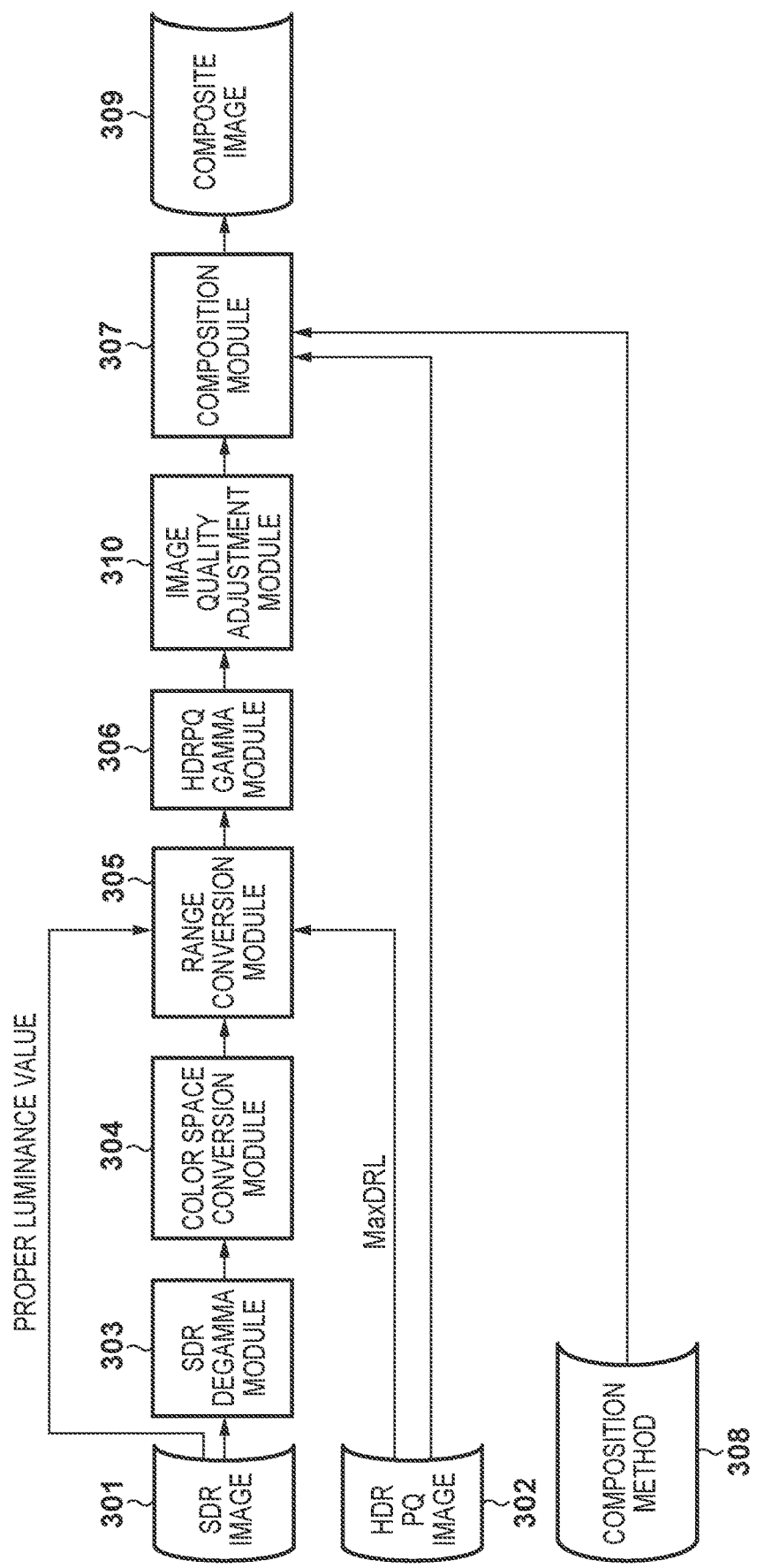

Therefore, in the module arrangement associated with the composition processing according to this modification, as shown in FIG. 3B, information of the proper luminance value acquired in association with the SDR image 301 is input to the range conversion module 305.

If such conversion is performed that the input/output characteristic changes at the knee point, as shown in FIG. 6B, there may exist a value range in which contrast becomes strong depending on the luminance value at the knee point and noise with a low amplitude which is difficult to be perceived before conversion may be enhanced after conversion. A composite image of a multiple exposure expression obtained by compositing the converted image based on the thus obtained second intermediate image may not be a preferable expression because the converted image and the HDRPQ image 302 are different in terms of the noise and resolution.

Therefore, in the composition processing of the modification, as shown in FIG. 3B, an image quality adjustment module 310 applies, to the second intermediate image applied with the gamma by the HDRPQ gamma module 306, image quality adjustment processing corresponding to the luminance value at the knee point, thereby generating a converted image. The image quality adjustment processing may be, for example, noise reduction processing, and the intensity of the processing is controlled in accordance with the luminance value at the knee point. For example, if the luminance value at the knee point is close to the peak luminance value of the first intermediate image, that is, if the inclination of the input/output characteristic associated with the second value range is steep, the intensity of noise reduction is increased. Conversely, if the inclination of the input/output characteristic associated with the second value range is moderate, the intensity of noise reduction is weakened.

In this way, the influence of deterioration of the image quality that may be caused by conversion of the dynamic range can be reduced. Thus, the noise and resolution are made to match between the converted image and the HDRPQ image 302, thereby generating a composite image of a preferable expression.

Note that the image quality adjustment processing applied by the image quality adjustment module 310 is not limited to the input of the noise reduction processing. For example, if the SDR image 301 is a so-called noiseless image such as computer graphics, the image quality adjustment processing may be not the noise reduction processing but processing of adding random noise to match with the noise level of the HDRPQ image 302.

This modification has described that the input/output characteristic in the range conversion module 305 indicates a form of a broken line, as shown in FIG. 6B. However, the disclosure is not limited to this, and the input/output characteristic may indicate a form of a curved line. In this case, the image quality adjustment processing performed by the image quality adjustment module 310 is configured to be adjusted in accordance with the input/output characteristic.

[Second Modification]

In each of the above embodiment and modification, the form in which a composite image of a multiple exposure expression is generated by compositing one HDRPQ image and one SDR image has been described. However, a plurality of images with each dynamic range may be used as inputs to the composition processing. At this time, if a plurality of HDRPQ images are input as composition targets, the maximum value of the MaxDRL values of the plurality of HDRPQ images is used as a peak luminance value set as the maximum value of the composition range.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-034770, filed Mar. 7, 2022, which is hereby incorporated by reference herein in its entirety.

What is claimed is:

1. An image processing apparatus comprising:
at least one processor and a memory containing instructions that, when executed by the at least one processor, perform operations configured to function as the following units:
a first acquisition unit configured to acquire a first image and a second image having a dynamic range wider than a dynamic range of the first image;
a conversion unit configured to generate a converted image by converting the dynamic range of the first image; and
a generation unit configured to generate a composite image by compositing the second image and the converted image generated by the conversion unit,
wherein the second image is a High Dynamic Range (HDR) image encoded by a Perceptual Quantization (PQ) method defined in ITU-R BT.2100,
wherein the conversion unit decides a composition range based on the second image, decides a peak luminance value of the dynamic range of the second image as a maximum value of the composition range, and converts the dynamic range of the first image into the composition range so that a maximum signal level of the converted image is set to a signal level corresponding to the maximum value of the composition range,
wherein each of the first image and the second image is an image obtained by applying gamma corresponding to the corresponding dynamic range to convert brightness of an object into a nonlinear signal, and
wherein the conversion unit generates a first intermediate image by applying degamma corresponding to the dynamic range of the first image and converting a signal of the first image into a linear luminance value, generates a second intermediate image by assigning the luminance value of the first intermediate image to a value range whose maximum value is the peak luminance value of the second image, and generates the converted image by applying the gamma corresponding to the dynamic range of the second image and converting the luminance value of the second intermediate image into a nonlinear signal.

2. The apparatus according to claim 1, wherein the conversion unit decides the composition range based on a maximum signal level of the second image.

3. The apparatus according to claim 1, wherein an input/output characteristic associated with the generation of the second intermediate image is obtained by scaling a range of the luminance value of the first intermediate image to a range whose maximum value is the peak luminance value of the second image.

4. The apparatus according to claim 1, wherein an input/output characteristic associated with the generation of the second intermediate image indicates a different characteristic with respect to an input to each of a first value range and a second value range determined for the luminance value of the first intermediate image with reference to a predetermined knee point.

5. The apparatus according to claim 4, wherein
the operations are further configured to function as a second acquisition unit configured to acquire a luminance value corresponding to proper exposure associated with the first image,
the predetermined knee point is a luminance value corresponding to the proper exposure acquired by the second acquisition unit, the first value range is a value range from a lower limit value of the luminance value to the luminance value corresponding to the proper exposure, and the second value range is a value range from the luminance value corresponding to the proper exposure to a peak luminance value of the first intermediate image.

6. The apparatus according to claim 5, wherein as the input/output characteristic associated with the generation of the second intermediate image, the same value is output with respect to an input of the luminance value within the first value range, and a value scaled to the value range from the luminance value corresponding to the proper exposure to the peak luminance value of the second image is output with respect to an input of the luminance value within the second value range.

7. The apparatus according to claim 4, wherein the conversion unit converts the luminance value of the second intermediate image into a nonlinear signal, and then executes image quality adjustment processing corresponding to the luminance value at the predetermined knee point, thereby generating the converted image.

8. The apparatus according to claim 1, wherein the conversion unit acquires the peak luminance value of the second image from metadata associated with the second image.

9. The apparatus according to claim 1, wherein a plurality of second images are used to generate the composite image, and the conversion unit decides a maximum value of peak luminance values of the plurality of second images as the maximum value of the composition range.

10. The apparatus according to claim 1, wherein the first image is a Standard Dynamic Range (SDR) image encoded by an ITU-R BT.709 standard.

11. A control method for an image processing apparatus, the control method comprising:

acquiring a first image and a second image having a dynamic range wider than a dynamic range of the first image;

generating a converted image by converting the dynamic range of the first image; and generating a composite image by compositing the second image and the generated converted image, wherein the second image is a High Dynamic Range (HDR) image encoded by a Perceptual Quantization (PQ) method defined in ITU-R BT.2100, wherein in generating the converted image, a composition range is decided based on the second image, a peak luminance value of the dynamic range of the second image is decided as a maximum value of the composition range, and the dynamic range of the first image is converted into the composition range so that a maximum signal level of the converted image is set to a signal level corresponding to the maximum value of the composition range, wherein each of the first image and the second image is an image obtained by applying gamma corresponding to the corresponding dynamic range to convert brightness of an object into a nonlinear signal, and wherein in generating the converted image, a first intermediate image is generated by applying degamma corresponding to the dynamic range of the first image and converting a signal of the first image into a linear luminance value, a second intermediate image is generated by assigning the luminance value of the first intermediate image to a value range whose maximum value is the peak luminance value of the second image, and the converted image is generated by applying the gamma corresponding to the dynamic range of the second image and converting the luminance value of the second intermediate image into a nonlinear signal.

12. A non-transitory computer-readable recording medium recording a program for causing a computer to:

acquire a first image and a second image having a dynamic range wider than a dynamic range of the first image;

generate a converted image by converting the dynamic range of the first image; and generate a composite image by compositing the second image and the generated converted image, wherein the second image is a High Dynamic Range (HDR) image encoded by a Perceptual Quantization (PQ) method defined in ITU-R BT.2100, wherein in generating the converted image, a composition range is decided based on the second image, a peak luminance value of the dynamic range of the second image is decided as a maximum value of the composition range, and the dynamic range of the first image is converted into the composition range so that a maximum signal level of the converted image is set to a signal level corresponding to the maximum value of the composition range, wherein each of the first image and the second image is an image obtained by applying gamma corresponding to the corresponding dynamic range to covert brightness of an object into a nonlinear signal, and wherein in generating the converted image, a first intermediate image is generated by applying degamma corresponding to the dynamic range of the first image and converting a signal of the first image into a linear luminance value, a second intermediate image is generated by assigning the luminance value of the first intermediate image to a value range whose maximum value is the peak luminance value of the second image, and the converted image is generated by applying the gamma corresponding to the dynamic range of the second image and converting the luminance value of the second intermediate image into a nonlinear signal.

* * * * *